W. L. SANTMYERS & R. L. HEPNER.
REAMER.
APPLICATION FILED MAY 5, 1914.

1,110,273.

Patented Sept. 8, 1914.

Witnesses
J. Milton Jester
C. Everett

Inventors
Washington L. Santmyers
Roy L. Hepner
By
J. R. Gourick
Attorney

UNITED STATES PATENT OFFICE.

WASHINGTON L. SANTMYERS AND ROY L. HEPNER, OF STRASBURG, VIRGINIA.

REAMER.

1,110,273.

Specification of Letters Patent.

Patented Sept. 8, 1914.

Application filed May 5, 1914. Serial No. 836,559.

*To all whom it may concern:*

Be it known that we, WASHINGTON L. SANTMYERS and ROY L. HEPNER, citizens of the United States, residing at Strasburg, in the county of Shenandoah and State of Virginia, have invented certain new and useful Improvements in Reamers, of which the following is a specification.

Our invention relates to boring and drilling devices, particularly to reamers, and has for its object the provision of a reamer having its cutting blades easily and quickly removable, and secured in place by novel clamping means locking or unlocking all the blades simultaneously, the clamping means being screw actuated longitudinally of the axis of the reamer.

Another object is to provide a device of this character which will be simple in construction and operation, durable and efficient in service and a general improvement of the art.

Figure 1:
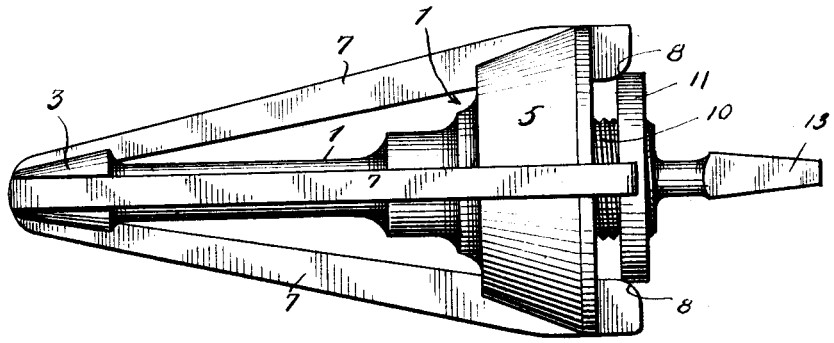
Figure 2:
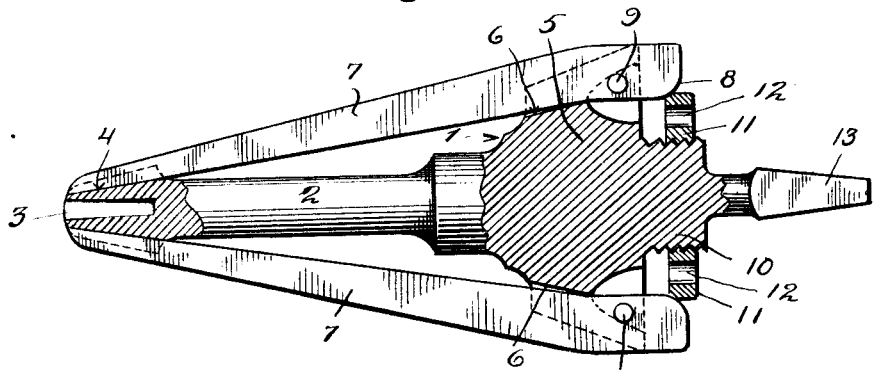
Figure 3:
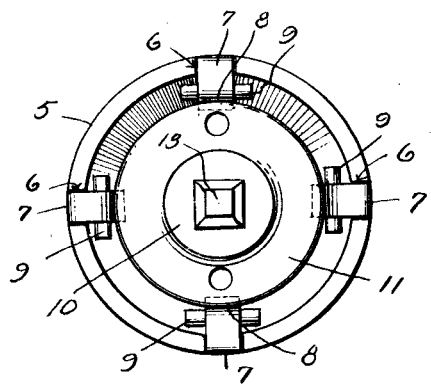

Other objects and advantages derived from the specific construction and arrangement of parts will be carefully brought out in the following description and illustrated in the accompanying drawings, in which:

Figure 1 is a side elevation of our improved device, Fig. 2 is a longitudinal section, and Fig. 3 is a rear elevation.

Referring more particularly to the drawings, the numeral 1 designates the main supporting body of the device comprising a spindle 2 terminating at its forward end in a head 3 having diametrically opposed grooves 4 formed therein. At its rear end the spindle 2 terminates in an enlarged frusto-conical member 5 in the form of a shell, the inner periphery of which is also frusto-conical. The shell 5 is provided with grooves 6 in alinement with the grooves 4 within which are adapted to be disposed blades 7 which have the inner portions of their rear ends curved as shown at 8.

In order to clamp the blades upon the spindle so that they may be readily removed and replaced, we provide the blades with transverse pins 9 which abut against the inner periphery of the shell 5. The clamping means comprises a screw-threaded extension 10 on the rear end of the spindle for carrying a clamping disk 11 which is threaded thereon and adapted to be rotated by the engagement of a spanner wrench within holes 12 in the disk 11. When the disk 11 is so rotated its periphery engages the curved ends 8 of the blades 7 and forces the rear ends of the blades forwardly and outwardly causing the pins 9 to press against the inner periphery of the shell 5, and secures the blades firmly in the slots.

The extension 10 has formed thereon a clutch engaging member 13 adapted for insertion within the clutch of a drill press, breast drill or any suitable means for rotating the device.

From the foregoing description and the drawings, it will be apparent that the blades 7 may be easily removed by unscrewing the disk 11 to release it from engagement with the curved portions 8 of the rear ends of the blades, and that if a blade becomes dull, chipped or otherwise rendered unfit for use it may be easily and quickly removed and another inserted in its place; the operation of removing or inserting a blade requiring only a few seconds of time. For the reception of a drill for starting the bore we provide a tapered recess in the end of the head of the spindle as shown in Fig. 2.

Having thus described our invention what we claim is:

1. A reamer comprising a central spindle, a frusto-conical shell formed on the rear of said spindle, a plurality of blades disposed in axial slots therein, and means operable longitudinally on said spindle and engaging the ends of said blades for clamping them in said slots.

2. A reamer comprising a central spindle, a frusto-conical shell formed on the rear of said spindle, a plurality of blades disposed in axial slots in said shell and having pivotal relation thereto, and means on said spindle for forcing the ends of said blades outwardly for engaging the other ends of said blades upon the spindle.

3. A reamer comprising a central spindle, a frusto-conical shell formed on the rear of said spindle, a head on the front end of said spindle, a plurality of blades disposed in axial slots in said shell, and means operable longitudinally on said spindle for clamping said blades in said slots and in slots on said head.

4. A reamer comprising a central spindle, an enlarged frusto-conical shell formed on the rear end thereof and provided with slots, a plurality of cutting blades disposed in said slots, a head formed on the front end of said spindle and provided with slots for the reception of the front ends of said blades, pins extending through said blades and engaging the inner periphery of said shell, the upper inner portion of said blades being beveled so as to allow for clamping, and means for clamping said blades, said means comprising a screw-threaded extension on said spindle and a disk threaded thereon and engaging the beveled portions of the rear ends of said blades, said disk having two holes passing therethrough for the reception of a suitable tool for tightening the disk.

5. A reamer comprising a central spindle, an enlarged frusto-conical shell formed on the rear end thereof and provided with slots, a plurality of cutting blades disposed in said slots, a head formed on the front end of said spindle and provided with slots for the reception of the front ends of said blades, pins extending through said blades and engaging the inner periphery of said shell, and means for clamping said blades, said means comprising a screw-threaded extension on said spindle and a plate threaded thereon and engaging the lower portions of the rear ends of said blades.

In testimony whereof we hereto affix our signatures in the presence of two witnesses.

WASHINGTON L. SANTMYERS.
ROY L. HEPNER.

Witnesses:
C. B. GUYER,
L. HURN.

Copies of this patent may be obtained for five cents each, by addressing the "Commissioner of Patents, Washington, D. C."